United States Patent
Grueneberg et al.

(10) Patent No.: US 11,288,443 B2
(45) Date of Patent: *Mar. 29, 2022

(54) SUMMARIZATION METHOD FOR RECORDED AUDIO

(71) Applicant: International Business Machines Corporation, Armonk, NY (US)

(72) Inventors: Keith William Grueneberg, Yorktown Heights, NY (US); Jason Crawford, Yorktown Heights, NY (US); Jonathan Lenchner, Yorktown Heights, NY (US); Satya V. Nitta, Yorktown Heights, NY (US); Christian Makaya, Summit, NJ (US); Sharad C. Sundararajan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,102

(22) Filed: Nov. 19, 2019

(65) Prior Publication Data

US 2020/0081966 A1  Mar. 12, 2020

Related U.S. Application Data

(60) Continuation of application No. 15/994,781, filed on May 31, 2018, now Pat. No. 10,592,599, which is a
(Continued)

(51) Int. Cl.
*G06F 40/169* (2020.01)
*G06F 40/279* (2020.01)

(52) U.S. Cl.
CPC .......... *G06F 40/169* (2020.01); *G06F 40/279* (2020.01); *H05K 999/99* (2013.01)

(58) Field of Classification Search
CPC ........ G06F 13/043; G06F 17/241; G06F 3/16; G06F 40/169; G06F 40/279; G10L 15/22; G10L 15/265; G10L 17/26; H05K 999/99
(Continued)

(56) References Cited

U.S. PATENT DOCUMENTS

| 598,655 A | 2/1898 | Dawson |
| 7,962,525 B2 | 6/2011 | Kansal |

(Continued)

OTHER PUBLICATIONS

United States Notice of Allowance dated Nov. 4, 2019, in U.S. Appl. No. 15/994,781.
(Continued)

*Primary Examiner* — Thierry L Pham
(74) *Attorney, Agent, or Firm* — Vazken Alexanian; McGinn I.P. Law Group, PLLC.

(57) ABSTRACT

A meeting summarization method, system, and computer program product, include capturing notes of a user including a time stamp from the user associated with a meeting, synchronizing an agenda of the meeting and the notes of the user based on a correlation between a time stamp of a topic on the agenda and a time stamp of the notes of the user, and analyzing the synchronized topic and the notes to determine highlights of the meeting based on a co-occurrence of the time stamp of the notes of the user and the time stamp of the topic on the agenda.

9 Claims, 4 Drawing Sheets

Related U.S. Application Data continuation of application No. 15/785,520, filed on Oct. 17, 2017, now Pat. No. 10,089,290, which is a division of application No. 15/250,780, filed on Aug. 29, 2016, now Pat. No. 9,875,225.

(58) Field of Classification Search
USPC .......................................................... 704/270
See application file for complete search history.

(56) References Cited

U.S. PATENT DOCUMENTS

| | | | | |
|---|---|---|---|---|
| 8,934,342 | B2* | 1/2015 | Bentley | ............... H04L 12/1818 |
| | | | | 370/235 |
| 9,875,225 | B1 | 1/2018 | Grueneberg | |
| 10,089,290 | B2 | 10/2018 | Grueneberg | |
| 10,592,599 | B2* | 3/2020 | Grueneberg | .......... G06F 40/169 |
| 2005/0289453 | A1* | 12/2005 | Segal | ........................ G06F 1/12 |
| | | | | 715/203 |
| 2007/0071206 | A1 | 3/2007 | Gainsboro et al. | |
| 2009/0222741 | A1 | 9/2009 | Shaw | |
| 2014/0157102 | A1 | 6/2014 | Grieb et al. | |
| 2016/0117624 | A1 | 4/2016 | Flores et al. | |

OTHER PUBLICATIONS

United States Office Action dated Jul. 3, 2019, in U.S. Appl. No. 15/994,781.

United States Office Action dated Apr. 16, 2019, in U.S. Appl. No. 15/994,781.

United States Office Action dated Dec. 31, 2018, in U.S. Appl. No. 15/994,781.

Mel, et al. "The NIST Definition of Cloud Computing". Recommendations of the National Institute Standards and Technology. Nov. 16, 2015.

United States Notice of Allowance dated Sep. 14, 2017 in U.S. Appl. No. 15/250,780.

United States Office Action dated Jun. 15, 2017 in U.S. Appl. No. 15/250,780.

\* cited by examiner

SUMMARIZATION METHOD FOR RECORDED AUDIO

CROSS-REFERENCE TO RELATED APPLICATIONS

The present application is a Continuation application of U.S. patent application Ser. No. 15/994,781, filed on May 31, 2018, which is Continuation application of U.S. patent application Ser. No. 15/785,520, now U.S. Pat. No. 10,089,290, issued on Oct. 2, 2018, which is Continuation application of U.S. patent application Ser. No. 15/250,780, now U.S. Pat. No. 9,875,225, issued on Jan. 23, 2018, the entire contents of which are hereby incorporated by reference.

BACKGROUND

The present invention relates generally to a meeting summarization method, and more particularly, but not by way of limitation, to a system, method, and computer program product for extracting or bookmarking the key segments of the audio recorded during meetings to create a meeting summarization.

Often, business meetings are recorded, so that the audio can be played back at a later time. A meeting attendee or other interested party may want to find a particular segment of audio from a prior meeting. However, it can be cumbersome to listen to long segments of audio, just to find the useful pieces of information embedded in the playback stream.

Conventional meeting summarization techniques consider capturing meeting notes from multiple attendees and related multimedia in a central place. The summarization is done by linking notes entered into a web application with video and other media (e.g. video, slides, etc.) captured and stored on server. The meeting attendees enter the meeting minutes directly in a web form.

However, needs in the art include the needs to automatically extract or bookmark the key segments of the audio recorded during meetings, which then may be used, for example, to create a meeting summarization.

SUMMARY

In an exemplary embodiment, the present invention can provide a computer-implemented meeting summarization method, the method including recording meeting audio of a meeting, capturing notes including a time stamp from each of a plurality of users associated with the meeting, synchronizing the recorded meeting audio of the meeting and each of the notes of each of the plurality of users based on a correlation between the time stamp, and analyzing the synchronized meeting audio and notes to determine highlights of the meeting based on a co-occurrence of notes between the plurality of users.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
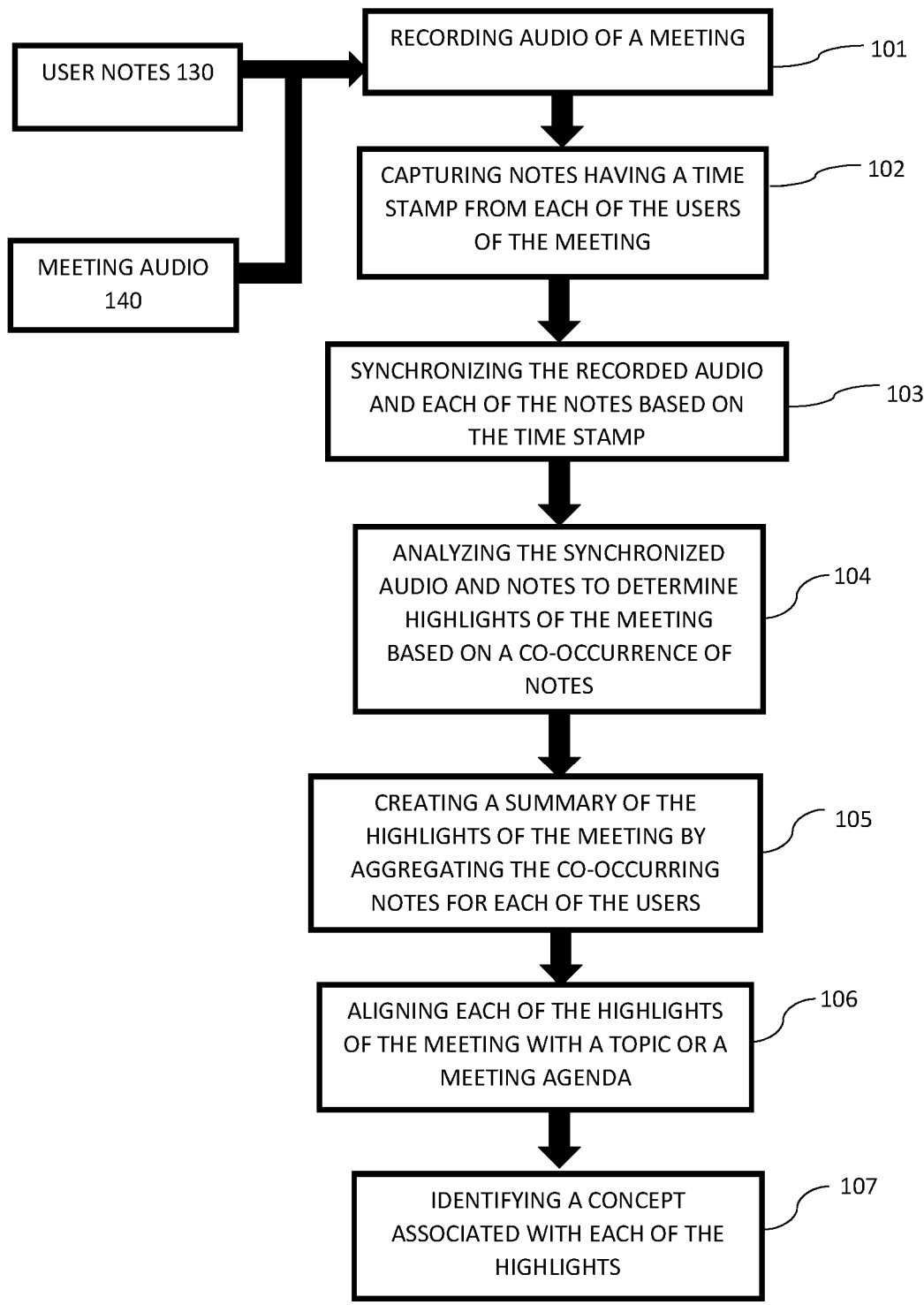
FIG. 1 exemplarily shows a high-level flow chart for a meeting summarization method 100.

The invention will now be described with reference to FIG. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

With reference now to the example depicted in FIG. 1, the meeting summarization method 100 includes various steps to aggregate the meeting highlights and create a condensed meeting summarization. As shown in at least FIG. 2, one or more computers of a computer system 12 according to an embodiment of the present invention can include a memory 28 having instructions stored in a storage system to perform the steps of FIG. 1.

Thus, the meeting summarization method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, meeting audio 140 of a meeting is recorded. The recording comprises a time stamp associated with each part of the audio. Preferably, the meeting audio 140 is recorded from a multi-person meeting using one or more microphones.

In step 102, notes including a time stamp of when the notes were taken from each user of the meeting are captured. That is, time-stamped notes taken by meeting attendees are captured such that the time stamp of when the notes were taken and the time stamp of the recorded meeting audio can be synchronized (as described later).

In some embodiments, as an input device, Smart Pens can be used to capture handwritten notes the user takes using the pen with a time stamp of when the notes that were taken. Alternatively, a key stroke logging software can be utilized to capture a time stamp of when a user enters notes into an electronic device such as a smart phone, laptop, computer, tablet, etc. In some embodiments, a user may take audio notes via an audio recording device which can log the time stamp of the audio input by the user (e.g., if the meeting is an online meeting or the user is at a remote location such that the user speaking does not interrupt the meeting). Further, a whiteboard (or the like) may be used with a camera capturing the text on the whiteboard.

In other words, in step 102, a time stamp associated with notes is captured for notes a user takes by as an input device (e.g., a smart pen, an electronic device, audio recorder, etc.).

In step 103, the recorded audio and each of the notes of the users are synchronized according to the time stamp. That is, the notes from each of the users is synchronized with the audio file for the same time (e.g., according to the time stamp) in step 103. For example, all of the notes taken for each of the users at the five-minute mark of the meeting are synchronized together with the audio from the five-minute mark of the meeting.

In some embodiments, the notes of users may correspond to audio from a previous time stamp (e.g., the user takes notes on what was previously discussed). In step 103, the recorded audio is synchronized with the associated note-taking since the note-taking may have started after the associated audio one wants to capture has begun. In one exemplary embodiment, the synchronization may compensate for the delay between the audio and the notes associated with the audio by synchronizing all the notes from a same time stamp with each other and treating this collective sample as a bag of words. Then, the sample of the bag of words from the notes is matched to the bag of words of the transcribed audio that preceded the note taking, going back a predetermined amount of time in the transcribed audio (e.g., thirty seconds, two minutes, five minutes, etc.). The bag of words can be used to create a map and identify the correlation between the audio and the collected notes. Additionally, the transcribed text can be annotated with the corresponding tone (from a tone analyzer) and sentiment analysis can be carried out on the text to measure the overall affect or mood of the summary. Since the attendees might have different background or interest, then this map can be used to classify attendees based on their background, understanding of the content, etc. Moreover, the map can be used in a replay tool to identify the highest note taken segments during the meeting. That is, a Natural Language Processor (NPL) may be used to associate the words in the notes with the words of the audio recording to synchronize the notes with the part of the audio recording that the notes were taken for.

In step 104, the synchronized audio recording with the notes is analyzed to determine highlights of the meeting based on a co-occurrence of notes from the users. Generally, a "co-occurrence" has a temporal (i.e., substantially same time) meaning or in some cases may have a content meaning (i.e., what the user's are writing if the content is analyzed and related). For example, if multiple user's take notes at a particular time stamp (e.g., a co-occurrence of notes), a highlight is associated with the time stamp that the co-occurrence of note taking occurred. That is, regardless of what the notes say, a highlight is determined if there is a co-occurrence of notes at a same time stamp.

Alternatively, in some embodiments, for example, a highlight may comprise a profits amount and goals for a quarter of sales based on the audio recording discussing profits and goals and each of the user notes referring to the profits and goals for the quarter. That is, a highlight of profits and goals is determined based on a co-occurrence of the notes of multiple users discussing profits and goals as well as the audio recording discussing the same. However, if the audio recording is discussing profits and goals and notes of a user recite "pick up bread at store", a highlight is not created because "pick up bread at the store" is not in the audio recording and does not co-occur in other users notes. In other words, the synchronized audio and notes from multiple meeting attendees are analyzed in step 104, looking for co-occurring note taking, to determine the meeting highlights. Thus, a meeting highlight may be when most notes are taken.

In step 106, each of the highlights determined in step 105 is aligned with a topic of the meeting or with a topic of a meeting agenda. For example, if there is no agenda, the topics of the meeting can be extracted from the audio recording using a NPL. The highlights can be aligned with the topics such that a user can later access the highlights of the meeting based on a topic. For example, if a user is only part of the marketing department but not part of the sales, the user may wish only to review highlights pertaining to the marketing topics and not the sales topics. Alternatively, the highlights may be aligned to each topic listed in the agenda. Thus, the users can select the highlights based on the agenda.

In step 107, a concept associated with the highlight can be identified based on the co-occurring notes. For example, the highlight may be about a topic of sales, but the concept of the topic may refer to how to increase sales. Using a NPL, the concept of "increasing sales" can be identified as the concept for the highlight and topic aligned with the highlight. Thus, "concept" may mean what the meeting is about.

In one exemplary embodiment, the users may be using smart pens with Bluetooth communication in a meeting room that is equipped with a hub that includes a microphone and Bluetooth wireless capabilities. Participants at a meeting are equipped with the pens for note taking, each with a sensor that detects the flow of ink from the tip and a Bluetooth wireless capability (e.g., in this embodiment, the ink strokes are not captured, just the fact that stroking is occurring). When the meeting begins, the host activates the microphone on the hub to record the audio of the meeting. Participants are encouraged to turn on the pens, which turns on the ability of the pens to detect inking (e.g., capturing the notes). When the pen detects the ink beginning to flow, it sends out a Bluetooth lower energy advertisement indicating that that pen is being used. A similar message is sent when ink stops flowing. When the hub detects an advertisement announcing the use or cessation of use of a pen, it notes the time of that event in the timeline of the audio captured. Subsequent to the meeting, the writing activity is analyzed and regions of the audio track in proximity to writing activity are tagged. That is, the timestamps of the handwritten notes stored on the server are analyzed, the application programing interface of the smart pen is used, and the most frequent time periods of user note taking activity are determined. The corresponding segments of audio for those time periods are saved along with handwritten notes and tagged as "highlights" in the meeting repository of the server. A summary of the meeting is a collection of the highlights sorted with the most intense note taking segments listed first. A user experience is provided that allows one to playback audio with various levels of details. Low level audio summarization includes only audio that occurred at the same time as the most intense inking activity. Medium level summarization includes audio capture near even isolated inking events.

Alternatively, instead of Bluetooth, ultrasound may be used. Pens emit an ultrasonic signal when stroking. The hub may listen for the presence and amplitude of the ultrasonic signal.

In some embodiments, a tablet and/or stylus may be used to take notes by the user. Meeting participants are equipped with tablets paired each with a stylus, network-synchronized clock, microphone, and a note taking application. As a meeting begins, each participant takes notes with his stylus as needed. The note taking application on the tablet captures strokes and audio and sends a message to a meeting summarization server every time ink stroking occurs. One or more tablets also send audio to the meeting summarization server either continuously or in proximity to inking events. Each inking notification and submitted audio segment includes a time stamp. At the end of the meeting, the host asks the summarization server to generate a summarization of the meeting audio.

In other exemplary embodiments, a meeting room may be equipped with a whiteboard and a camera directed at the whiteboard. The camera also includes a microphone. At the beginning of the meeting, the host turns on the camera and microphone. A meeting summarization server monitors the audio and images captured by the camera. When the meeting summarization server detects a writing on or erasure of the whiteboard, it notes when this occurs in a timeline. At the end of the meeting, the host asks the meeting summarization server for a meeting summary. The server generates a summary by analyzing the video stream for whiteboard inking/erasing activity and including primarily segments that include that activity.

Thereby, the notes of each meeting attendee can be analyzed to determine the time stamps of the "meeting Highlights". For example, if the speaker says something particularly poignant, it is likely that most of the attendees will be taking notes at that moment. Several of these moments can then be extracted from the audio of a long meeting, to, e.g., create a summary of the meeting highlights. Alternatively, or in addition, the method 100 may identify the segments of the meeting of special notes, isolate the associated audio streams, and either from the notes or the actual audio transcript, provide a summarization, and for each summarization a link to the associated audio segment. Additionally, if there is a meeting agenda, the method 100 may automatically try to associate these especially noteworthy incidents to items on the agenda (e.g. by doing a word similarity assessment between the words in the agenda item and words in the extracted text and words in the associated notes). Finally, when the meeting notes are hosted on the Cloud, the notes can be augmented with related concepts aligned to the central set of concepts that are being discussed to assist the attendees in understanding concepts that they might otherwise find difficult.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Figure 2:
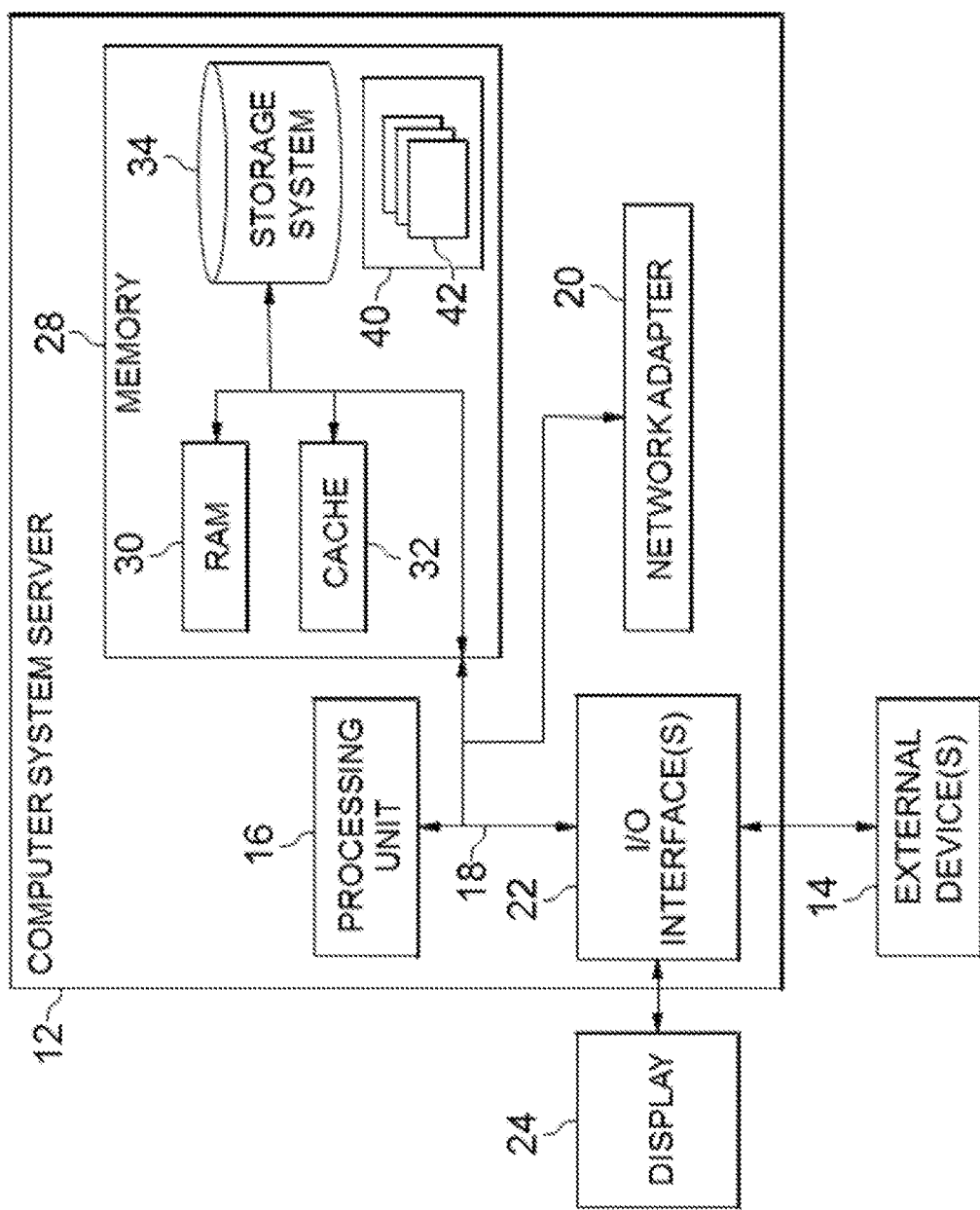
FIG. 2 depicts a cloud-computing node 10 according to an embodiment of the present invention.

Referring now to FIG. 2, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
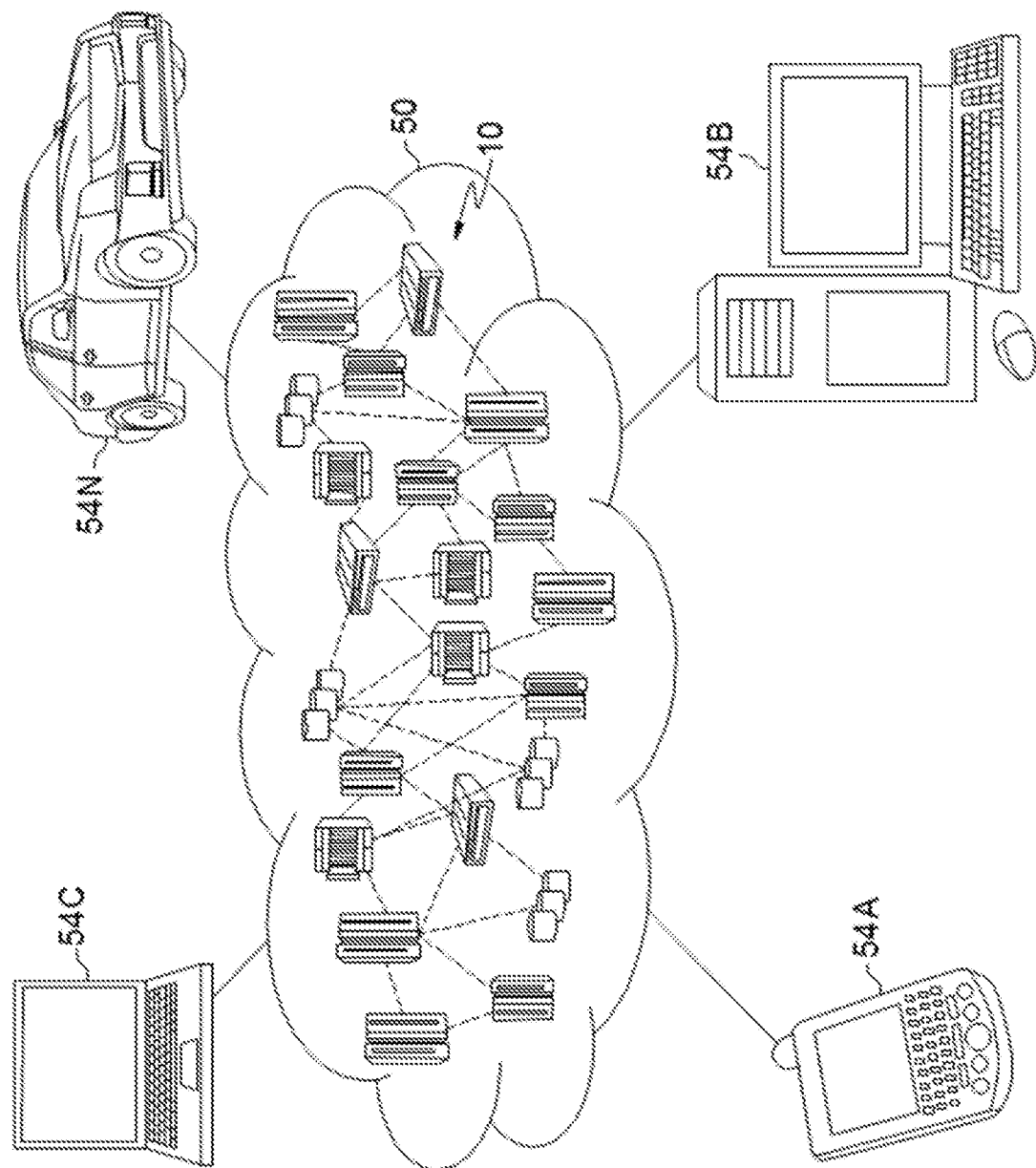
FIG. 3 depicts a cloud-computing environment 50 according to an embodiment of the present invention.

Referring now to FIG. 3, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud-computing environment 50 can communicate with any type of computerized circuit over any type of network and/or network addressable connection (e.g., using a web browser).

Figure 4:
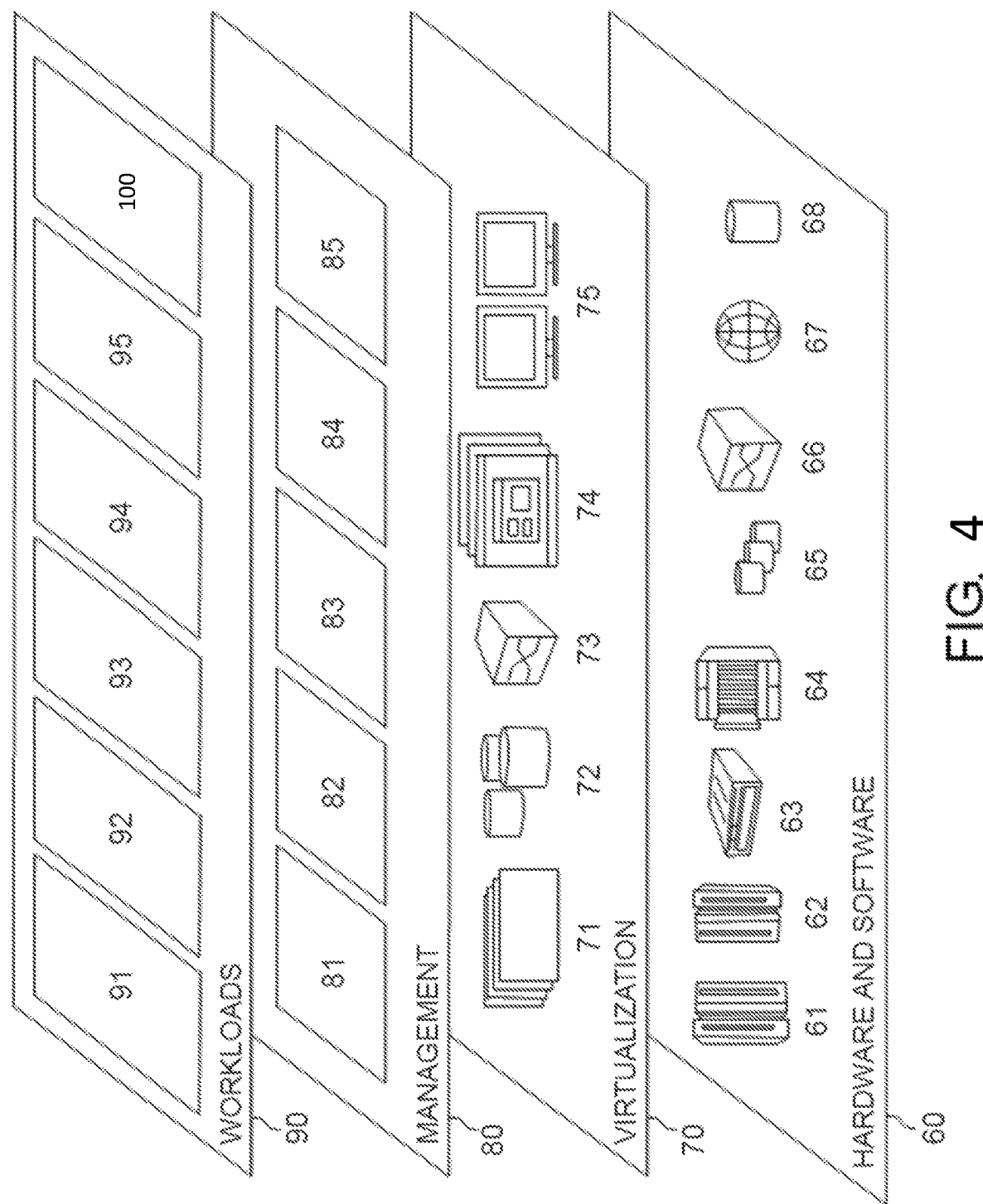
FIG. 4 depicts abstraction model layers according to an embodiment of the present invention.

Referring now to FIG. 4, an exemplary set of functional abstraction layers provided by cloud-computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the meeting summarization method 100.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented meeting summarization method, the method comprising:
    capturing notes, via a link with a note-taking device, including a time stamp associated with a meeting; and
    labeling highlights of the meeting based on a co-occurrence of the time stamp of the notes and the time stamp of a topic within an agenda of the meeting regardless of a current time in the meeting.

2. A computer program product for meeting summarization, the computer program product comprising a computer-readable storage medium having program instructions embodied therewith, the program instructions executable by a computer to cause the computer to perform:
    capturing notes, via a link with a note-taking device, including a time stamp associated with a meeting; and
    labeling highlights of the meeting based on a co-occurrence of the time stamp of the notes and the time stamp of a topic within an agenda of the meeting regardless of a current time in the meeting.

3. A meeting summarization system, comprising:
    a processor; and
    a memory, the memory storing instructions to cause the processor to:
        capturing notes, via a link between a hub and a note-taking device, including a time stamp associated with a meeting; and
        labeling highlights of the meeting based on a co-occurrence of the time stamp of the notes and the time stamp of a topic within an agenda of the meeting regardless of a current time in the meeting.

4. The computer-implemented method of claim 1, further comprising creating a summary of the highlights of the meeting by aggregating the co-occurring notes.

5. The computer-implemented method of claim 1, wherein the highlights are determined according only to a match of the time stamp of the co-occurrence of notes.

6. The computer-implemented method of claim 1, further comprising aligning each of the highlights of the meeting with a topic of a meeting agenda.

7. The computer-implemented method of claim 1, further comprising identifying a concept associated with each of the highlights from processing the recorded audio to create a summary of the meeting based on concepts,
    wherein the concepts are identified based on an analysis of an overlapping content during the meeting.

8. The computer-implemented method of claim 1, wherein the co-occurrence is determined based on at least two of the plurality of users taking notes at a same time stamp.

9. The computer-implemented method of claim 1, embodied in a cloud-computing environment.

* * * * *